(12) United States Patent
Lynn et al.

(10) Patent No.: US 8,583,464 B2
(45) Date of Patent: Nov. 12, 2013

(54) SYSTEMS AND METHODS FOR OPTIMIZING MARKET SELECTION FOR ENTITY OPERATIONS LOCATION

(75) Inventors: Margaret A. Lynn, Charlotte, NC (US); Benjamin T. Teal, Charlotte, NC (US); Michael Parker, Charlotte, NC (US); Charles Kosior, Charlotte, NC (US); Timothy Prentice, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 793 days.

(21) Appl. No.: 12/062,658

(22) Filed: Apr. 4, 2008

(65) Prior Publication Data

US 2009/0254395 A1 Oct. 8, 2009

(51) Int. Cl.
*G06Q 10/06* (2012.01)

(52) U.S. Cl.
CPC ..................... *G06Q 10/06* (2013.01)
USPC ....................................... 705/7.12

(58) Field of Classification Search
CPC ....................................... G06Q 10/06
USPC ....................................... 705/7.12
See application file for complete search history.

(56) References Cited

U.S. PATENT DOCUMENTS

| 5,991,735 | A  | * | 11/1999 | Gerace .......................... 705/7.33 |
| 6,298,328 | B1 | * | 10/2001 | Healy et al. ...................... 705/10 |
| 6,301,516 | B1 | * | 10/2001 | Ostrowski et al. ............ 700/109 |
| 7,337,127 | B1 | * | 2/2008  | Smith et al. ................. 705/14.66 |
| 8,234,180 | B2 | * | 7/2012  | Danzan ......................... 705/26.2 |
| 2002/0143599 | A1 |   | 10/2002 | Nourbakhsh et al. |
| 2003/0033195 | A1 | * | 2/2003  | Bruce et al. ...................... 705/10 |
| 2003/0069774 | A1 | * | 4/2003  | Hoffman et al. .................. 705/8 |
| 2004/0039619 | A1 | * | 2/2004  | Zarb .................................. 705/7 |
| 2005/0171877 | A1 | * | 8/2005  | Weiss .............................. 705/35 |
| 2006/0161447 | A1 |   | 7/2006  | O'Hollearn et al. |
| 2007/0150342 | A1 | * | 6/2007  | Law et al. ........................ 705/14 |
| 2008/0056279 | A1 | * | 3/2008  | Lund et al. ..................... 370/400 |
| 2008/0077509 | A1 |   | 3/2008  | Rossmark et al. |
| 2008/0208652 | A1 | * | 8/2008  | Srivastava ......................... 705/7 |

(Continued)

OTHER PUBLICATIONS

Alexander Ardichvilia, Richard Cardozob, Sourav Rayc, A theory of entrepreneurial opportunity identification and development, Elsevier, Journal of Business Venturing 18, (2003), 105-123, ftp://ns1.ystp.ac.ir/YSTP/3/E-%20Book%201%20(G)/E-%20book/Magazine/4/6.pdf.*

*Primary Examiner* — Romain Jeanty
*Assistant Examiner* — Kurtis Gills
(74) *Attorney, Agent, or Firm* — Weiss & Arons LLP; Michael Springs

(57) ABSTRACT

Systems and methods for corporate workplace capacity planning and optimization are provided. A system according to the invention may include a computer. The computer may be configured to receive a plurality of characteristics relating to an entity or a portion of an entity. The computer may be further configured to receive a predetermined selection of buildings. The computer may also be configured to determine a plurality of solution sets. Each of the solution sets may express a subset of space located within the selected buildings for the location of the entity or the portion of the entity. The solution sets may be fixed for a predetermined amount of time into the future. The solutions sets can be based, at least in part, on the plurality of characteristics. The computer may also be configured to select a subset of the plurality of solution sets. Finally, a display device may be configured to display at least a portion of a single solution set.

5 Claims, 13 Drawing Sheets

(56) References Cited

U.S. PATENT DOCUMENTS

| | | |
|---|---|---|
| 2008/0208654 A1 | 8/2008 | Nahikian et al. |
| 2008/0312942 A1* | 12/2008 | Katta et al. ........................ 705/1 |
| 2009/0144125 A1* | 6/2009 | Bandyopadhyay et al. .... 705/10 |
| 2009/0187447 A1* | 7/2009 | Cheng et al. ...................... 705/7 |
| 2009/0276290 A1* | 11/2009 | Sill ................................. 705/10 |

* cited by examiner

|  | Risk | Quality |
|---|---|---|
| Risk |  | 1 |
| Quality | 1 |  |

—802

| Legend | |
|---|---|
| 9 | Row much more important than column |
| 3 | Row somewhat more important than column |
| 1 | Row same importance as column |
| 0.333 | Row somewhat less important than column |
| 0.111 | Row much less important than column |

—804

| Percent Importance Ranking | |
|---|---|
| 50.00% | Risk |
| 50.00% | Quality |

|  | Labor Force Availability | Diversity | New Economy Environment | Education | Quality of Life |
|---|---|---|---|---|---|
| Labor Force Availability |  | 3 | 9 | 3 | 9 |
| Diversity | 0.3333 |  | 3 | 1 | 3 |
| New Economy Environment | 0.1111 | 0.3333 |  | 1 | 0.3333 |
| Education | 0.3333 | 1 | 1 |  | 3 |
| Quality of Life | 0.1111 | 0.3333 | 3 | 0.3333 |  |

FIG. 9

SYSTEMS AND METHODS FOR OPTIMIZING MARKET SELECTION FOR ENTITY OPERATIONS LOCATION

CROSS REFERENCE TO RELATED APPLICATION

This application claims priority from U.S. application Ser. No. 12/062,616, entitled SYSTEMS AND METHODS FOR CORPORATE WORKPLACE CAPACITY PLANNING AND OPTIMIZATION, filed on Apr. 4, 2008, which is hereby incorporated by reference herein in its entirety.

FIELD OF TECHNOLOGY

Aspects of the disclosure relate to corporate workplace capacity planning and optimization.

BACKGROUND

It would be desirable to optimize corporate workplace capacity planning. It would further be desirable to provide a process that optimizes market selection for entity locations.

SUMMARY OF THE INVENTION

It is an object of this invention to provide systems and methods that optimize corporate workplace capacity planning. It is a further object of this invention to provide a process that optimizes market selection for entity locations.

A method including receiving a plurality of characteristics relating to an entity or a portion of an entity is provided. The method may include receiving a predetermined selection of buildings. The method may also include determining a plurality of solution sets. Each of the solution sets preferably expresses a subset of space located within the selected buildings for the location of the entity or the portion of the entity. The solution set may be forecast for a predetermined amount of time into the future. The solution sets may be based, at least in part, on the plurality of characteristics.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 8 shows an exemplary Critical-To-Quality matrix according to the invention;

FIG. 9 shows another exemplary matrix according to the invention;

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
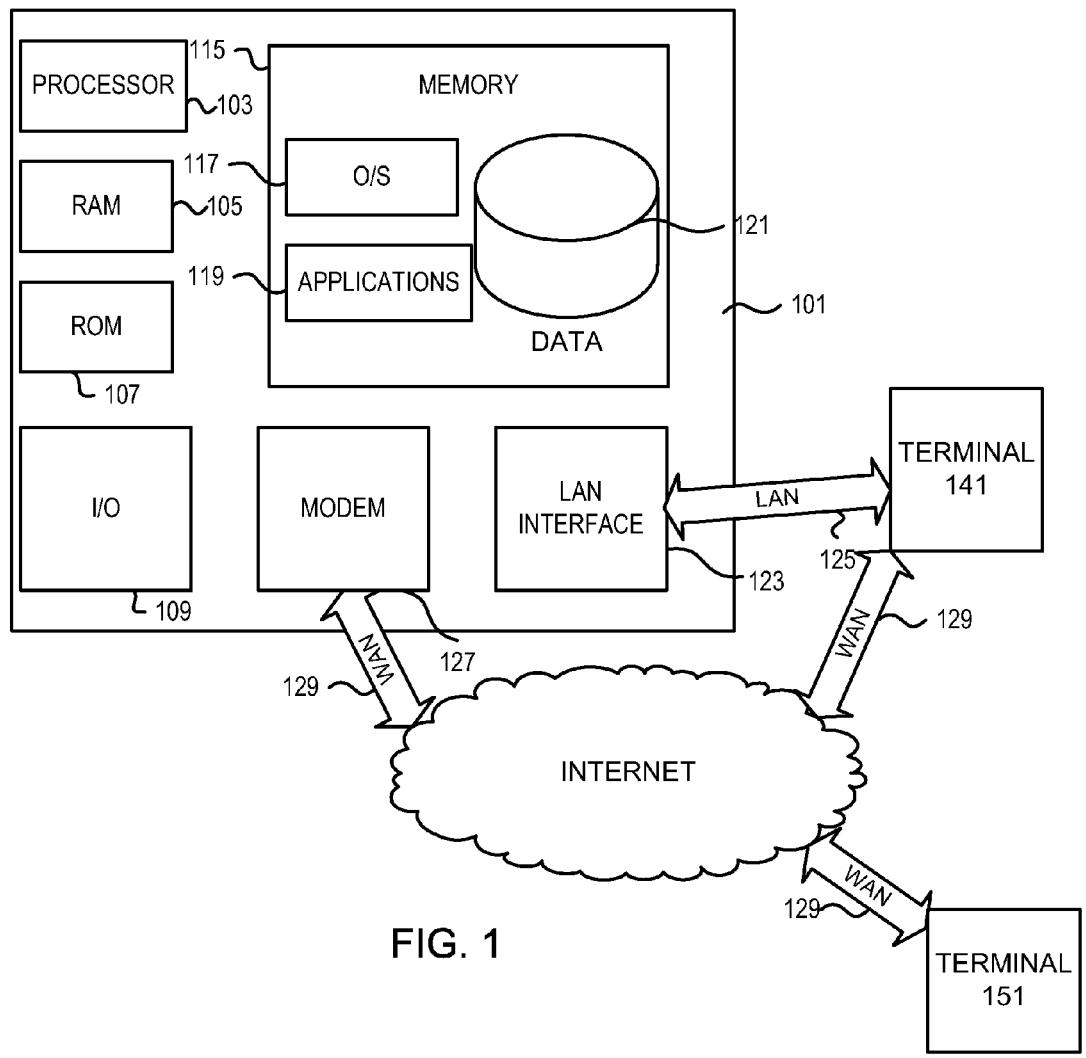
FIG. 1 is a schematic diagram of a general-purpose digital computing environment in which one or more aspects of the present invention may be implemented.

FIG. 1 illustrates a block diagram of a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

I/O module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 121. Alternatively, some or all of server 101 computer executable instructions may be embodied in hardware or firmware (not shown). As described in detail below, database 121 may provide centralized storage of account information and account holder information for the entire business, allowing interoperability between different elements of the business residing at different physical locations.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119 used by server 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Figure 2:
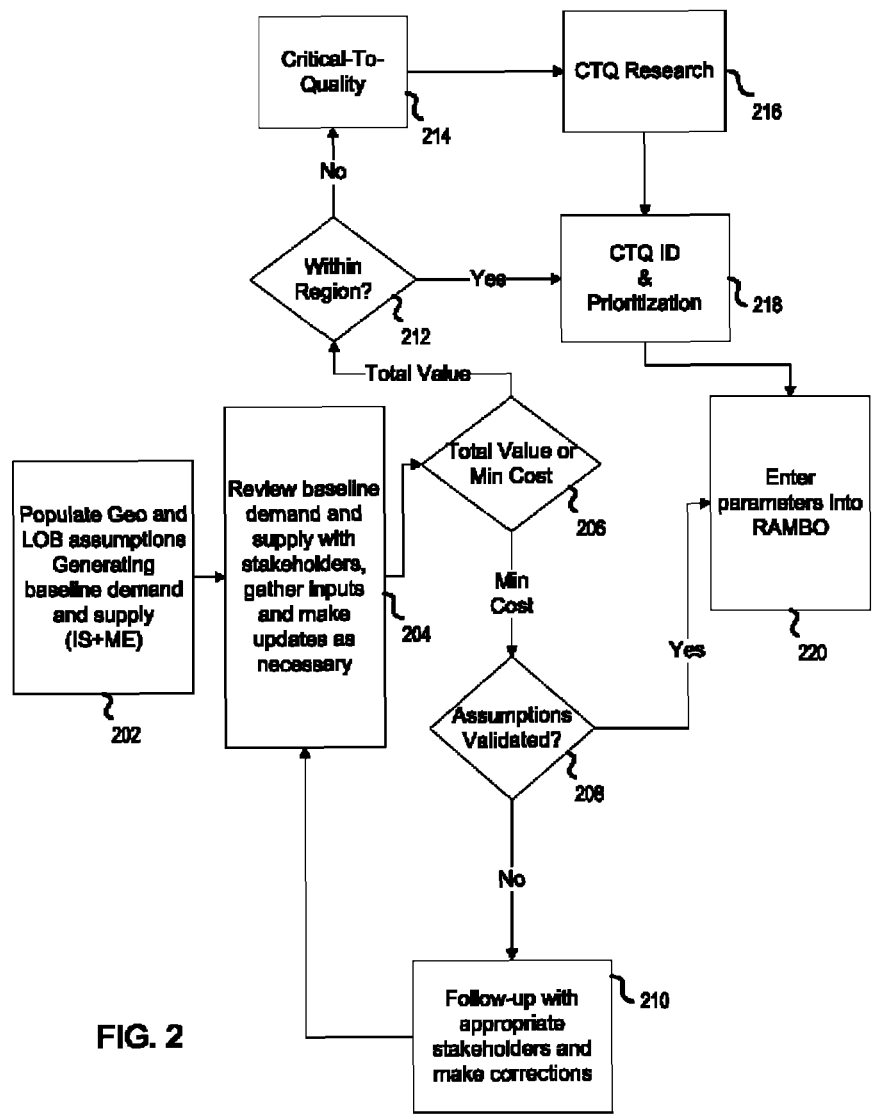
FIG. 2 is an illustrative flow diagram of the first part of a corporate workplace planning process according to the invention.

FIG. 2, labeled V.O.C. (voice of client), shows an illustrative flow diagram of the first part of a corporate workplace planning process according to the invention. Step 202 shows gathering and understanding of information gleaned from internal clients based on both geographic perspectives as well as L.O.B. (line of business) perspectives—i.e., a particular aspect of an entity's business which may require specialized real estate needs. Such LOBs (or smaller subdivisions of such LOBs) may include a credit card division (deposits, technology and/or operations), a consumer real estate division or other suitable division. One purpose of step 202 can be to generate a baseline demand and supply for the real estate needs in an area. For the purposes of this application, demand may be understood to refer to the amount of space that is required, while supply refers to the amount of space available.

Inferential Statistics ("IS") which indicates the current growth trend in the portion of the entity being studied, as well as the Macroeconomic Modeling ("ME"), which predicts economic development over the next 3-4 years or some other predetermined time period, may also be considered when establishing baseline demand and supply. The determination of inferential statistics as well as the macroeconomic modeling are shown in more detail in FIGS. 12 and 13 and are described in the portion of the specification corresponding thereto.

Step 204 involves a review of the baseline established in Step 202 with stakeholders such as individuals associated with an individual division within an entity. Any appropriate input and updates should be implemented to preferably improve the accuracy of the baseline.

In Step 206, the entity can utilize the refined, updated baseline information and determine whether the goal of economic growth will be achieved by minimizing costs, or by capitalizing on the total values of the real estate based on regional and C.T.Q. (critical to quality factors) which will be expounded on further in steps 212, 214, 216, and 218.

Step 208 shows the path when the flow diagram indicates that economic growth will be obtained using the minimum cost assumption. Step 208 further indicates that assumptions, such as a decision to proceed along the minimum cost path, can be validated.

In response to a "No" answer to the validation of assumptions query, step 210 shows following-up with appropriate stakeholders and making corrections as necessary. Thereafter, the process may return to reviewing step 204.

In response to a "Yes" answer to the validation query, the user may be directed to enter parameters into "RAMBO" —an acronym for Research, Analysis, Markets, Building Optimization—as shown in step 220. One purpose of RAMBO is to offer an optimized real estate solution based on a set of predetermined constraints. Such constraints may include a decision whether an entity or a select portion of an entity desires to enter and/or exit a predetermined building, whether the entity or a select portion of the entity can fit more personnel in a predetermined building, the target for future growth for an entity or a selected portion of an entity, and/or whether an entity or a selected portion of an entity desires to enter or exit a particular market or any other suitable parameter.

When total value is determined in step 206 to be the path of choice, then the process may proceed with step 212, in which the region of choice is determined. If no region is determined, then the Critical-to-Quality ("CTQ") factors are reexamined in step 214, followed by CTQ research in step 216.

Examples of CTQ factors may include labor force availability, diversity, New Economy environment, education, and/or quality of life. Labor force availability may be analyzed by using population density statistics and/or population forecasts. Diversity may be determined using a diversity index. New Economy environment—whether the work force has access to Internet and other technological advances, may be determined using statistics relating to the percentage of students in public schools versus the percentage of students in private schools. Education may be determined using statistics relating to the distribution of degrees in the relevant population sector. Quality of life may be determined using indices related to culture, religion, education, crime and/or other suitable quality of life factors.

Thereafter, or, alternatively, following a region determination from step 212, a step of CTQ identification and prioritization can be implemented as shown in step 218. The CTQ factors can then be introduced into RAMBO as step 220 as an alternative approach to parameter building from the minimum cost approach.

Figure 3:
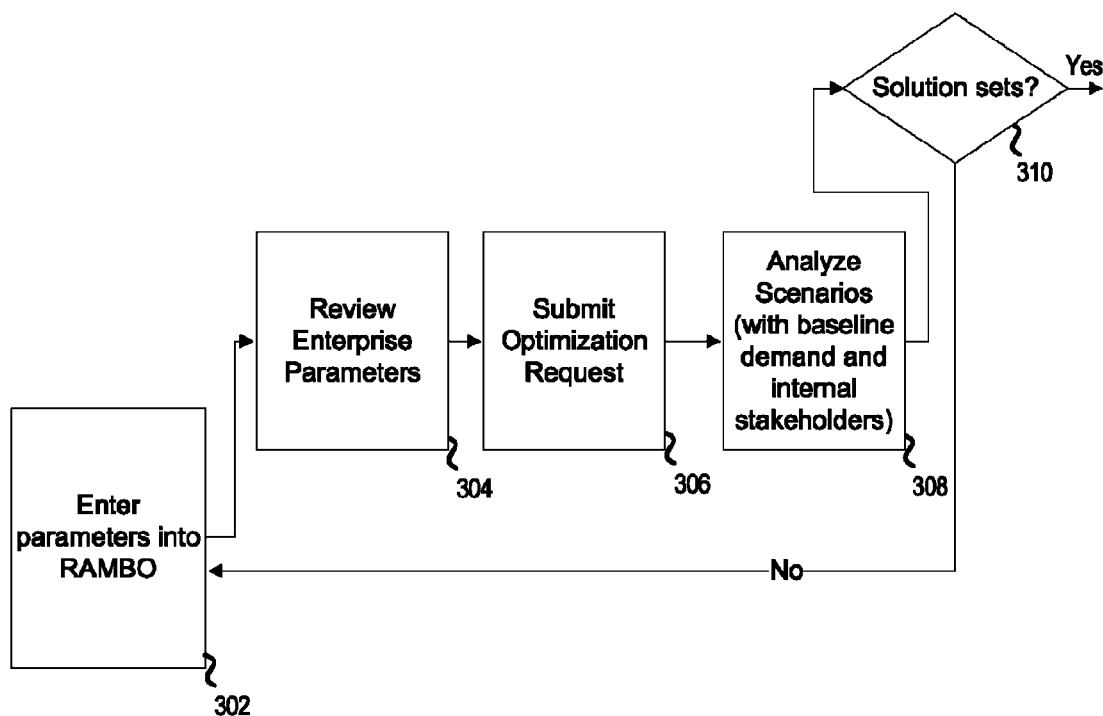
FIG. 3 shows an illustrative flow diagram that continues from the illustrative flow diagram in FIG. 2.

FIG. 3 shows a flow diagram that continues from step 220 in FIG. 2. Step 220 in FIG. 2 has been reproduced as step 302 in FIG. 3. Step 304 shows reviewing enterprise parameters. Step 306 shows submitting an optimization request preferably in order to optimize enterprise parameters. Step 308 shows analyzing scenarios together with internal stakeholders. These scenarios are preferably analyzed at a baseline demand—i.e., a predetermined number of places required for employees. Step 310 queries whether a plurality of real estate "solution sets" have been obtained based on the modeling provided by RAMBO. Further details of the implementation of RAMBO are set forth below in the portion of the specification corresponding to FIG. 6.

Figure 4:
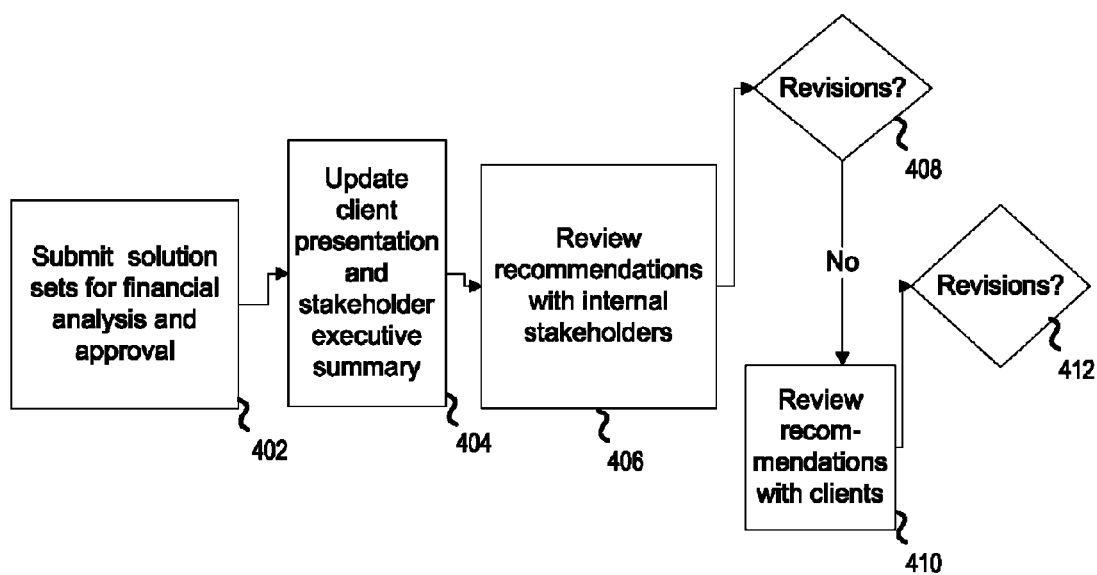
FIG. 4 shows an illustration of the authorization portion of the capacity planning and optimization.

FIG. 4 shows a flow diagram that illustrates the authorization portion of the capacity planning and optimization. Step 402 shows submitting the solution sets confirmed in step 310 for financial and other analysis and approval. Step 404 shows updating the client presentation and stakeholder executive summary. Thereafter, or concurrently therewith, step 406 shows reviewing recommendations with internal stakeholders. Step 408 queries whether revisions to the solution sets needed to be made.

If the answer to the query is Yes, then a process according to the invention may return a user to step 220 (not shown in FIG. 4) in order to revise the parameters in RAMBO. If the answer to the query is No, then a process according to the invention may preferably forward the solution sets to clients for recommendations which may be followed by an additional set of revisions, as shown in step 312. If the answer to the query in step 312 is Yes, then a process according to the invention may return a user to step 220 (not shown in FIG. 4) in order to revise the parameters in RAMBO. If the answer to the query in step 312 is No, then the process according to the invention may continue to the project commissioning phase which is shown in more detail in the flow diagram in FIG. 5.

Figure 5:
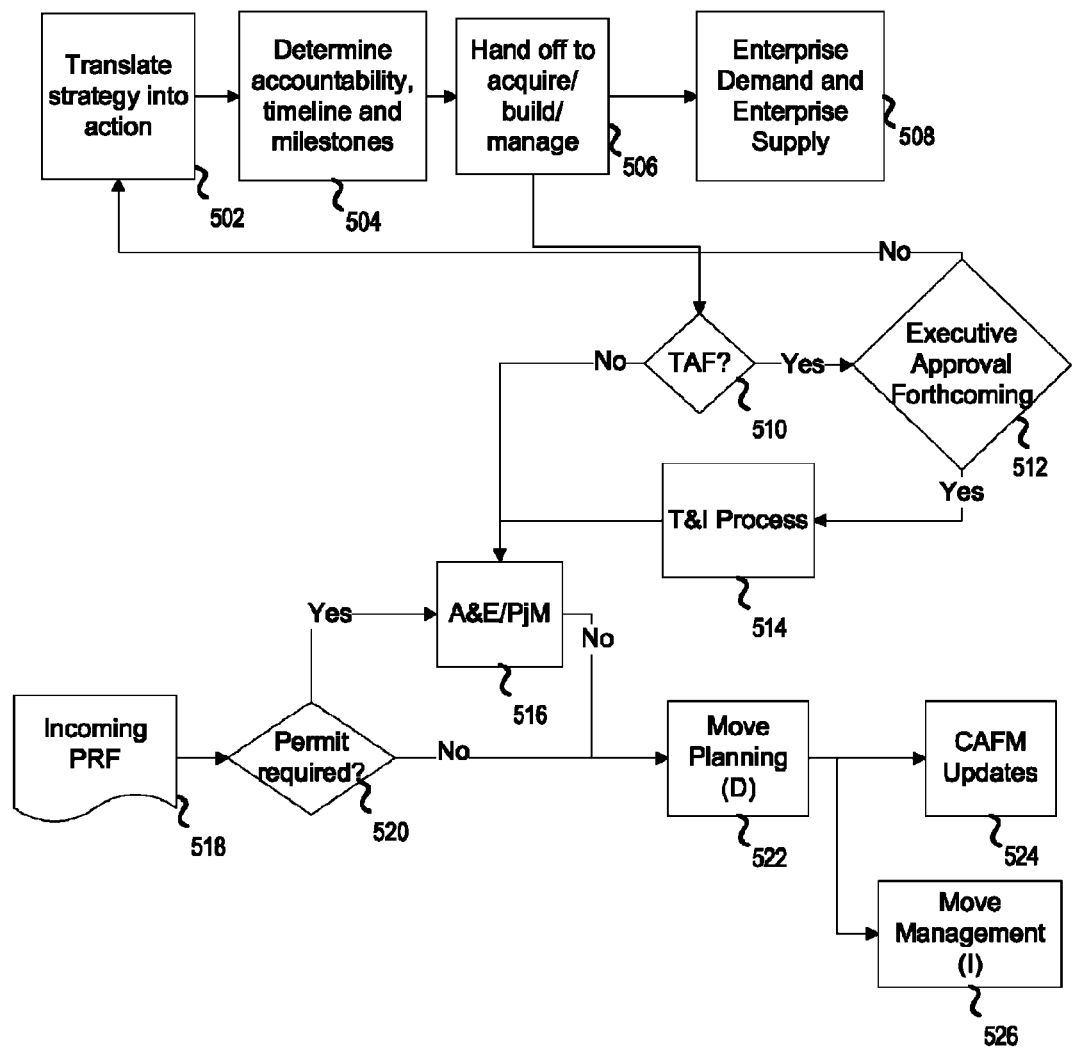
FIG. 5 shows an illustrated flow diagram of a portion of the process according to the invention relating to the commissioning of additional work in order to better service the client corporate workplace needs.

FIG. 5 shows an illustrated flow diagram of a portion of the process according to the invention relating to the commissioning of additional work in order to better service the client corporate workplace needs. Step 502 shows translating the overarching strategy into action. Step 504 shows determining accountability, timeline and milestones for a commissioned project. Step 506 shows handing off the project to the selected acquirer/builder/or manager. Step 508 shows that following the completion of the project, the finished project may then be aggregated into the entity's total demand and supply scheme.

With respect to the project itself, one embodiment of the invention may query whether a transaction approval form ("TAF") is required, as shown in step 510. If such a form is required, then a signature of an executive of a predetermined level within the entity may also be required, as shown in step 512. Assuming that such a signature is forthcoming, the process may continue at step 514 with the transaction and investment processes, which can include purchase/sale/or sublease of buildings or parts of buildings, as shown in step 514. If such a signature is not forthcoming, then the process may return to step 502 in order to better translate strategy into action.

Additional embodiments of the invention may preferably require a TAF for a broad range of products. By increasing the number of projects that require a TAF, the control of the purchase/building/leasing aspects of the market pass more fully into the hands of the executives of the entity.

In the circumstances where either a TAF was not required, or executive approval was forthcoming, the process may continue with the contributions directed to architecture and engineering ("A&E") of the project under the control of the project management ("PjM"), as show in step 516.

Step 518 shows the introduction of a project request form for an individual project. Such a project is typically internally generated and can vary in complexity. If a permit is required for such a project, as queried in step 520, then the coordination of the permit may be assigned to project management. If no permit is required, then move planning 522 and move management 524 may be coordinated. Move management may be coordinated together with computer aided facility management 526.

Figure 6:
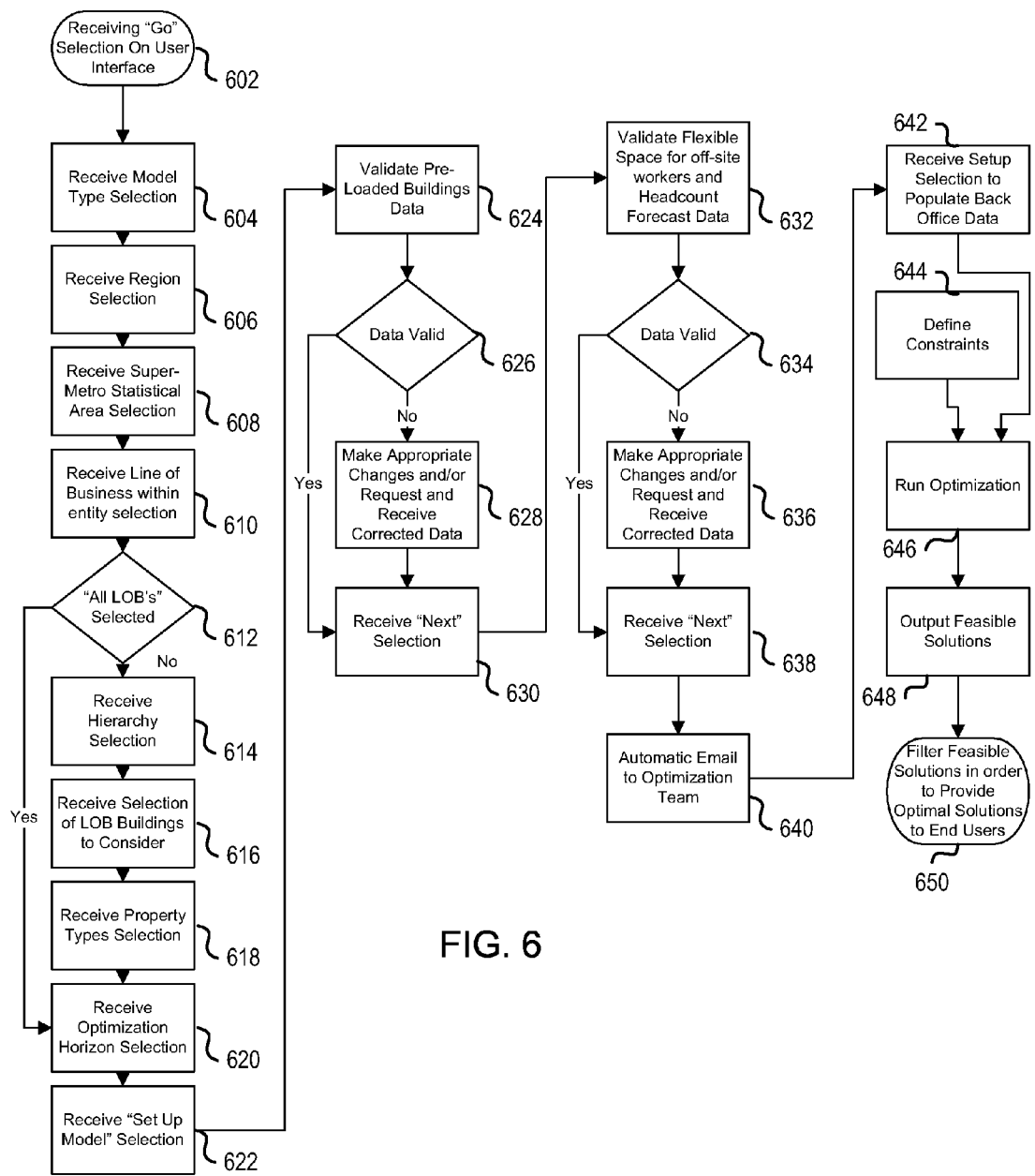
FIG. 6 shows an illustrated flow diagram that corresponds to a Research, Analysis, Markets, Building Optimization process according to the invention.

FIG. 6 is an illustrative flow diagram of one exemplary implementation of RAMBO. Step 602 shows receiving a "go" selection on a user interface. Thereafter, the process and/or system according to the invention can receive a model type selection 604—e.g., minimum cost model or total value model. Step 606 shows receiving geographic region selection. Step 608 shows receiving super-metro statistical area selection ("SMSA") which may be a more granular geographic pointer than selected in step 606.

Step 610 shows receiving a selection of a particular line of business ("LOB") within an entity. A particular line of business in an entity such as a bank may fall into one or more of the following categories: consumer real estate, credit card services, deposits, technology and operations, and/or any other suitable division within the bank. Step 612 shows that, when all LOBs are selected, the process may jump forward to receiving an optimization horizon selection, as shown in step 620.

Each of the LOBs may include a hierarchy aspect. The hierarchy aspect may inform which part of the entity that the LOB is associated with—e.g., global technology and operations, network computing group, corporate workplace, service and fulfillment and/or any other suitable part of the entity. If all LOBs are not selected, the process according to the invention may receive a hierarchy selection 614 and a selection of LOB buildings to consider 616. Step 618 shows receiving a selection for the type of property that may be used in determining the solution sets.

In other embodiments of the invention, the LOB may preferably provide more granular targets that the LOB may be interested in considering. Such more granular targets for consideration may include submissions of selections of individual floors within a building or selections of groups of floors within a building. For example, in a financial services entity, certain unique restrictions may apply—e.g., financial instrument traders and financial entity analysts may be restricted from sitting on the same floor. Accordingly, a space plan for the traders and the analysts may be required to account for the separation of the aforementioned two groups of personnel.

Having more closely identified the areas of interest of a user, the system and process may preferably receive an optimization horizon selection, as shown in step 620. Such a selection may preferably identify a window in time that a user may be interested in seeing feasible solutions. Such a window in time may be 1, 2, 3, and/or 5 years or any other suitable window in time that may be desired.

Following the input of the information in steps 604-620, the system and/or process according to the invention may receive a "set up model" selection, as shown in step 622. In order to set up a model, the system and/or process may preferably validate pre-loaded buildings data in order to ensure that the data in the system regarding available space is current. Following a determination of validity of data 626 and a receipt of a next selection, the system may proceed to validate flexible space for off-site workers and to forecast the headcount data, as shown in step 632. If data is determined to be invalid, then appropriate changes may be requested and/or made, and corrected data may be received.

Step 634 shows validating flexible space and headcount forecast data. Such flexible space may be reservation-based for individuals. In reservation-based space, less actual space may be used to provide workspace for a greater number of individuals.

Following appropriate changes and receipt of corrected data 636, or upon validation of the data, a next selection may be received. An optimization e-mail or other suitable electronically generated transmission may be transmitted to an optimization team as shown in step 640. Upon receipt of a setup selection in the e-mail or other suitable electronic transmission, back office data may be populated 642 in order to run the optimization 646. Step 644 shows defining constraints preferably prior to the running of the optimization.

The process may output feasible solutions, as shown in step 648, and filter the feasible solution in order to provide optimal solutions to end users as shown in step 650. Such optimal solutions may preferably be provided as part of step 310 shown in FIG. 3.

Figure 7:
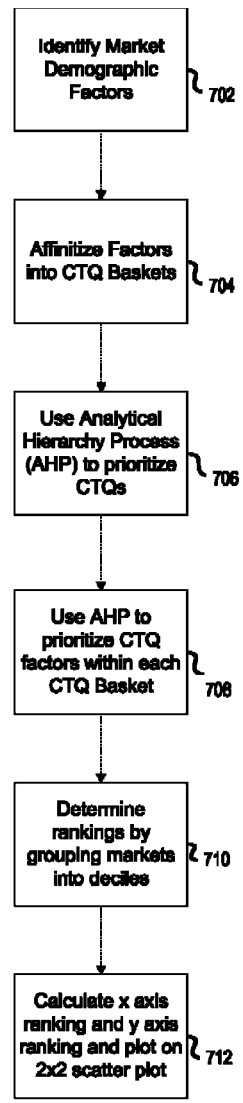
FIG. 7 illustrates an overview of a process according to the invention for creating a demographics model.

FIGS. 7-11 relate to creating a demographics model to optimize market selection for various entity and/or entity division locations. FIG. 7 is a flow diagram that illustrates an overview of a process according to the invention for creating the demographics model according to the invention.

Step 702 shows identifying market demographic factors. Step 704 shows affinitizing—i.e., grouping factors that share similar characteristics—the identified factors into critical-to-quality ("CTQ") baskets such as quality, cost, and risk. Step 706 shows using an analytical hierarchy process ("AHP") to prioritize CTQs. Such a hierarchy process may preferably include identifying which portion of the entity that is involved in the real estate planning. Examples of portions of such entities include a global technology applications group, a network computing group, a corporate workplace group, and a customer service and fulfillment group.

In addition to the prioritization of CTQs, step 708 shows using the AHP to prioritize CTQ factors within each CTQ basket. As described above, CTQ factors may include labor force availability, diversity, New Economy environment, education, quality of life and/or other suitable factors.

Step 710 shows determining rankings by grouping markets into deciles. This may be calculated with respect to each of the CTQ factors. Step 712 shows calculating an x-axis ranking and a y-axis ranking and plotting the ranking on a scatter plot. In one embodiment of the invention, shown as FIG. 11, a 2×2 scatter plot 1102 in which the x-axis ranking is a total market quality rank for each market (which may incorporate a factor that takes into account the risk of the market) and the y-axis ranking is a cost ranking.

FIG. 8 shows an exemplary CTQ matrix 802 that contrasts CTQ baskets risk and quality. Matrix 902 may be applicable to a single predetermined market or, alternatively, may be applicable across a number of markets. FIG. 8 further includes a legend 804 that may be used in the matrix to prioritize the CTQs against each other in a methodological manner. Finally, graphic 806 shows that, in the exemplary matrix displayed in 802, the risk and quality are asked to be of equal importance.

FIG. 9 shows another exemplary matrix 902 which analyzes various CTQ factors within a CTQ basket. The CTQ basket preferably is relevant to a particular market. In this particular matrix, the factors that are analyzed include labor force availability, diversity, New Economy environment, education, quality of life. It should be noted that the weights attributed to these factors may have been allocated in response to values obtained from entity executives, employees or other individuals. Alternatively, these weights may have been obtained by automatic processing of available data pertaining to a predetermined market.

Matrix 902 may preferably be quantified to obtain numeric rankings of the relative importance each of the various factors. Using one exemplary calculation, each of the columns may be summed and a ratio between the individual factor value in the column and the sum may be obtained. Thereafter the sum of each of the ratio for each of the factors may be totaled. The total sums for each of the respective factors may then be ranked. Moreover, a quantitative value may be assigned to the importance of each of the factors. Using this methodology, matrix 902 preferably obtains the following relative importance ranking for the factors: labor force availability %47.10, diversity %18.91, education %16.95, quality of life %8.93, and New Economy environment %8.11.

Figure 10:
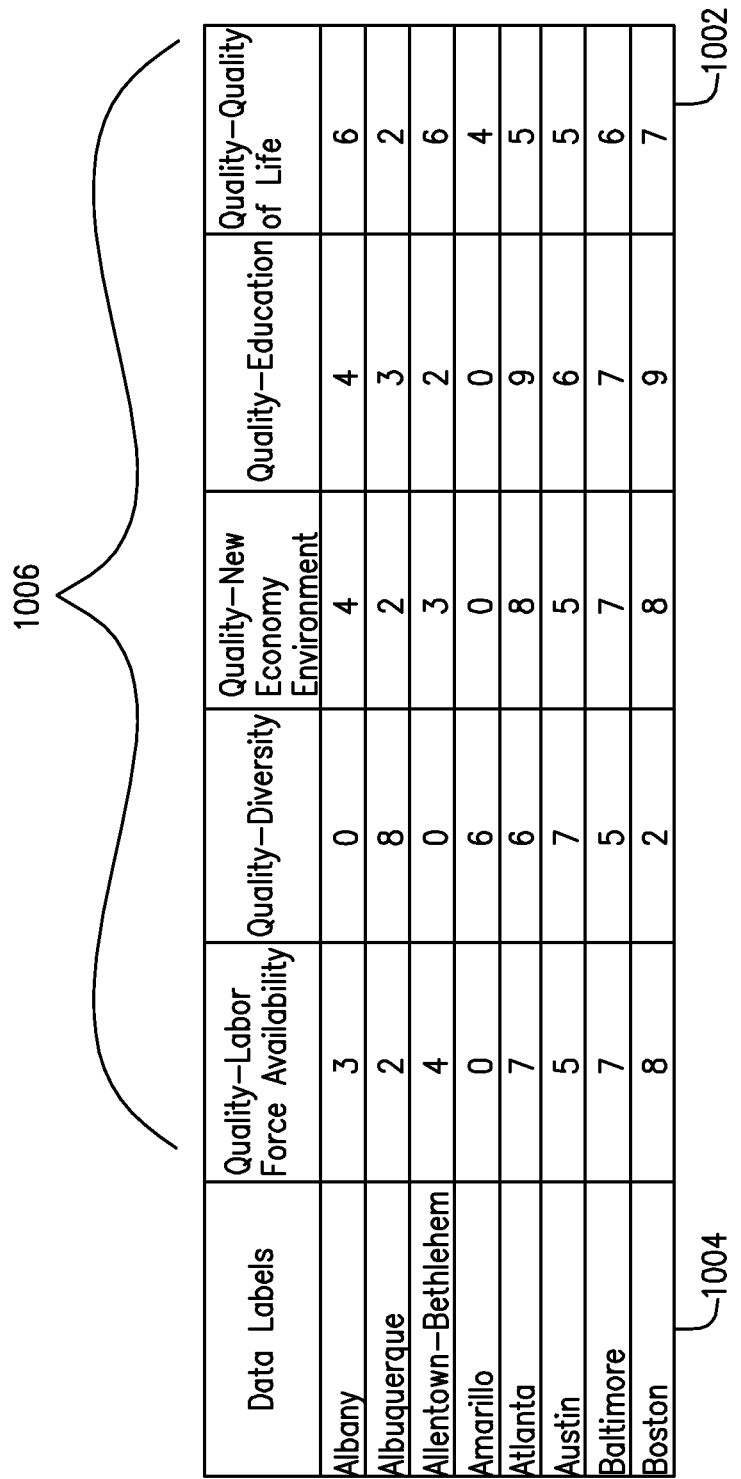
FIG. 10 shows yet another matrix according to the invention.
Figure 11:
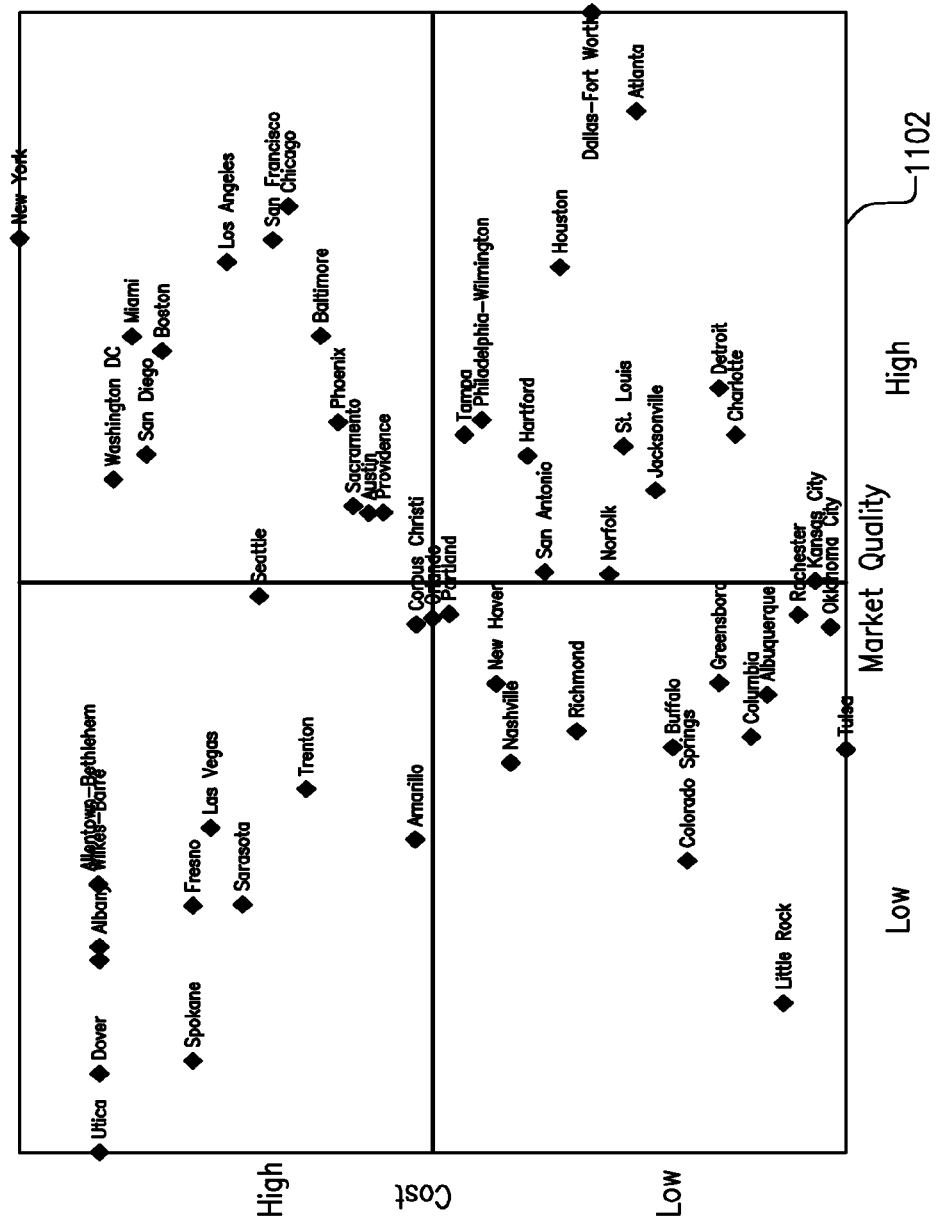
FIG. 11 shows a 2×2 scatter plot according to the invention.

FIG. 10 shows a matrix 1002 of each of eight different markets 1004. Each of the markets has been preferably plotted on a 2×2 matrix with cost plotted against total market quality. As described above, market quality preferably accounts for risks associated with a market as well as the benefit that can be obtained from such a market. Accordingly, matrix 1002 preferably accounts for the CTQ baskets, quality, cost, and risk, set forth above.

Markets may preferably be ranked, at least in part, using mathematical equations. Such equations may incorporate the CTQ baskets as well as the individual CTQ factors. The following exemplary equation shows one method of differentiating a favorable market from a non-favorable market.

$$\text{Favorable Markets} = \max \sum_{i=1}^{m} wi \left( \sum_{j=1}^{m} wjxj \right), 0 \le wi \le 1, 0 \le wj \le 1$$

wherein $$\max \sum_{i=1}^{m} wi \left( \sum_{j=1}^{m} wjxj \right)$$

represents the weighted sum of the CTQ baskets and ($\Sigma_{j=1}^{m} wjxj$) represents the weighted sum of the CTQ factors.

Additionally, the following exemplary equation preferably represents one method of determining optimal markets as described above with respect to the RAMBO process.

$$\text{Optimal Markets} = \min(\text{Total Cost}) \text{ s.t. } \max \sum_{i=1}^{n} \left( wi \sum_{j=1}^{m} wjxj \right)$$

It should be noted that each of the equations represents only a single mathematical arrangement for determining the relative favorability of the markets and the relative optimization of the markets, respectively. Nevertheless, other mathematical arrangements may preferably be used to derive appropriate determinations with respect to relatively favorable markets and relatively optimal markets without departing from the scope of the invention.

Figure 12:
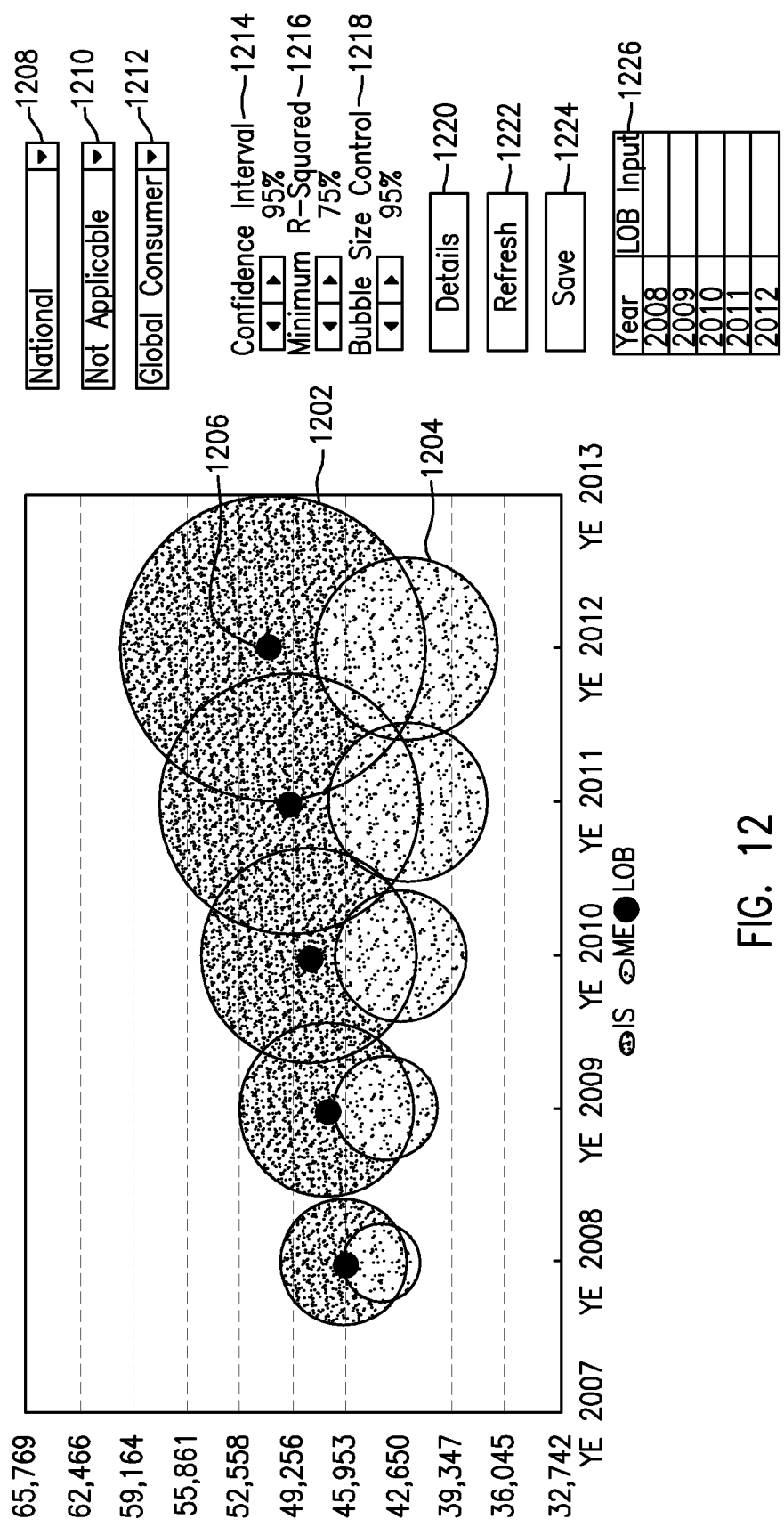
FIG. 12 shows one embodiment of a graphical illustration of an employee headcount forecast according to the invention.

FIG. 12 shows one embodiment of a graphical illustration of an employee headcount forecast. The output shown in the graphical illustration, and preferably obtained using methods according to the invention, forecasts possible headcounts based at least on a combination of inferential statistics, macroeconomic modeling, and entity (or portion of entity) predictions. Such a forecast may be applicable to entities, or portions of entities, of any suitable size.

In certain embodiments of the invention, the information used to provide macroeconomic modeling may include selected economic variables including, but not limited to, Consumer trends (which may includes such information as Consumer Price Index (CPI), Consumer Spending, Consumer Income, Unemployment, etc.), Corporate Trends (which may include such information as Income, Bond Rates, Job Creation, etc.), and/or General Economic Trends (GDP, Interest Rates, Money Supply, etc.). Specifically, the foregoing variables may be selected from a larger group and used as monthly lagged predictors ranging from one date to another date based on economic data downloaded from a data source such as Moody's Investors' Services of New York, N.Y.

In order to more finely tune the selected variables, the level of risk may be selected, the level of variation of the forecast may be selected, the difference between a fitted line and actual values may be selected, as well as other statistical measures may be used to more closely predict the headcount at selected future dates.

FIG. 12 includes bubbles 1202. Each of bubbles 1202 preferably corresponds to projected headcounts according to inferential statistics based on the recent entity history for a predetermined entity over a period of five years—i.e., 2008-2012. Each of bubbles 1202 preferably have a high end and a low end—e.g., 2008 bubble 1202 shows a high end of about 50,000 and a low end of about 42,000.

Each of bubbles 1204 preferably corresponds to projected headcounts according to macroeconomic modeling for a predetermined entity over the same period of five years—i.e., 2008-2012. Each of bubbles 1202 preferably has a high end and a low end—e.g., 2008 bubble 1204 shows a high end of about 45,000 and a low end of about 41,000.

FIG. 12 also shows the entity forecasts 1206 for headcount over the next five years. FIG. 12 further includes a graphical user interface that allows a user to more specifically tailor the output from the graph according to certain parameters. Such parameters may include a selectable region field 1208, a selectable metropolitan area within a region field 1210, and/or a selectable line of business or other pre-determined portion of an entity field 1212.

The confidence associated with the accuracy of the forecast may be adjusted using a selectable confidence interval field 1214, a variation—i.e., a goodness of fit—determination may be selected in Minimum R-Squared field 1216, and a Bubble Size Control 1218 may be selected as well.

Figure 13:
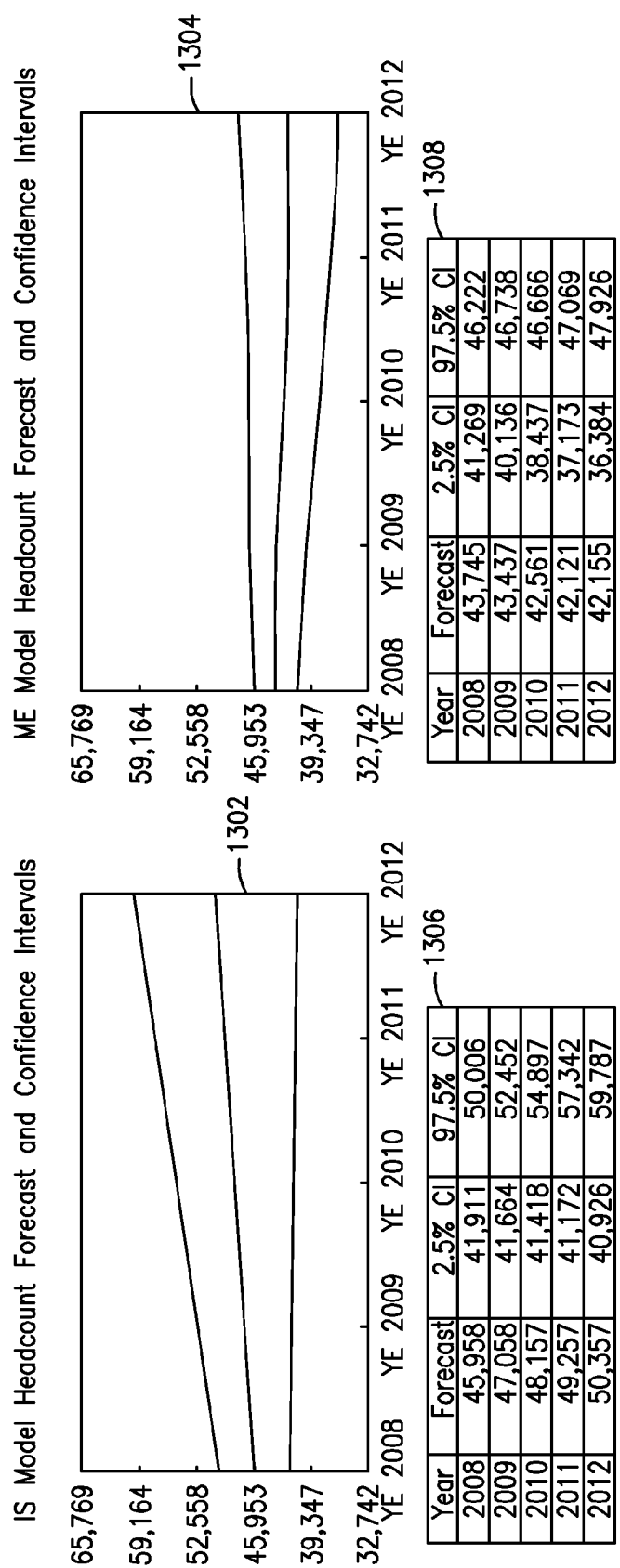
FIG. 13 shows a second embodiment of a graphical illustration of an employee headcount forecast according to the invention.

Selecting details button 1220 may preferably cause the graphics shown in FIG. 13 to be displayed. Refresh field 1222 may cause the resetting of the selected parameters. Save field 1224 may save the selected parameters. LOB Input field 1226 may preferably provide fields for input of line of business (LOB) forecasts.

FIG. 13 shows alternative graphics representing projections of macroeconomic modeling. Graphic 1302 shows a five-year projection using straight lines that preferably corresponds to the projection associated with the bubbles 1202 that show the projected headcount based on inferential statistics. Graphic 1304 shows a five-year projection using straight lines that preferably corresponds to the projection associated with the bubbles 1204 that show the projected headcount based on macroeconomic modeling.

Chart 1306 preferably corresponds to the underlying numbers behind the graphic 1202 and 1302. These numbers include the LOB forecast numbers, the low-end inferential statistics number (to a confidence level on the low-end of 2.5%), and a high-end inferential statistics number (to a confidence level on the high-end of 97.5%).

Chart 1308 preferably corresponds to the underlying numbers behind the graphic 1204 and 1304. These numbers include the LOB forecast numbers, the low-end macroeconomic modeling number (to a confidence level on the low-end of 2.5%), and a high-end macroeconomic modeling number (to a confidence level on the high-end of 97.5%).

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for optimizing workplace capacity planning according to the invention have been provided. Persons skilled in the art will appreciate that the present invention can be practiced by other than the described embodiments, which are presented for purposes of illustration rather than of limitation, and the present invention is limited only by the claims which follow.

What is claimed is:

1. One or more non-transitory computer-readable media storing computer-executable instructions which, when executed by a processor on a computer system, perform a method for optimizing market selection for entity operations location, the method comprising:
   receiving an identification of a plurality of market demographic factors, the market demographic factors including labor force availability, diversity, education and quality of life;
   affinitizing the market demographic factors into a plurality of critical-to-quality baskets, the critical-to-quality baskets including quality, cost and risk; and
   ranking a plurality of demographic locations, the ranking of the plurality of demographic locations being calculated at least in part by the equation $$\Sigma_{i=1}^{m} wi(\Sigma_{j=1}^{m} wjxj), 0 \leq wi \leq 1, 0 \leq wj \leq 1;$$

wherein:
   $\Sigma_{i=1}^{m} wi (\Sigma_{j=1}^{m} wjxj)$ corresponds to a weighted sum of the critical-to-quality baskets;
   $\Sigma_{j=1}^{m} wjxj$ corresponds to a weighted sum of the market demographic factors; and
   the weighted sum of the market demographic factors relates at least in part to data pertaining to the demographic location being ranked.

2. The method of claim 1 further comprising grouping ranked demographic locations into deciles.

3. The method of claim 1 further comprising:
   calculating an x-axis value and a y-axis value for each of the demographic locations; and
   plotting each of the demographic locations on a scatter plot.

4. An apparatus for optimizing market selection for entity operations location, the apparatus comprising:

a workstation comprising:
    a workstation storage device;
    a workstation processor connected to the workstation device, the workstation storage device storing a workstation program for controlling the workstation processor; and
    the workstation processor operative with the workstation program to receive determinations of relative importance of a market demographic actor with respect to other market demographic factors; and
a server operative to communicate with the workstation and to receive the determinations of relative importance of the market demographic factor, the server comprising:
    a server storage device;
    a server processor connected to the server storage device, the server storage device storing a server program for controlling the server processor; and
    the server processor operative with the server program to select a demographic location from among a plurality of demographic locations at least in part in response to a ranking of the plurality of demographic locations;
wherein the ranking of the plurality of demographic locations is executed by a second workstation processor, the ranking comprising:

receiving an identification of a plurality of market demographic factors;
affinitizing the market demographic factors into a plurality of critical-to-quality baskets, the critical-to-quality baskets including quality, cost and risk; and
ranking the plurality of demographic locations, the ranking of the plurality of demographic locations being calculated at least in part by the equation $$\Sigma_{i=1}^{m} wi(\Sigma_{j=1}^{m} wjxj), 0 \le wi \le 1, 0 \le wj \le 1;$$

wherein:
    $\Sigma_{i=1}^{m} wi\, (\Sigma_{j=1}^{m} wjxj)$ corresponds to a weighted sum of the critical-to-quality baskets;
    $\Sigma_{j=1}^{m} wjxj$ Corresponds to a weighted sum of the market demographic factors; and
    the weighted sum of the market demographic factors relates at least in part to data pertaining to the demographic location being ranked.

5. The apparatus of claim 4, the server processor operative with the server program to select the demographic location from among a plurality of demographic locations at least in part in response to a tabulation of values associated with a plurality of market demographic factors associated with the non selected markets.

\* \* \* \* \*